(No Model.)
J. E. MORRIS.
TRANSFERRING CABLE CARS FROM ONE LINE TO A CROSSING LINE.
No. 467,457. Patented Jan. 19, 1892.
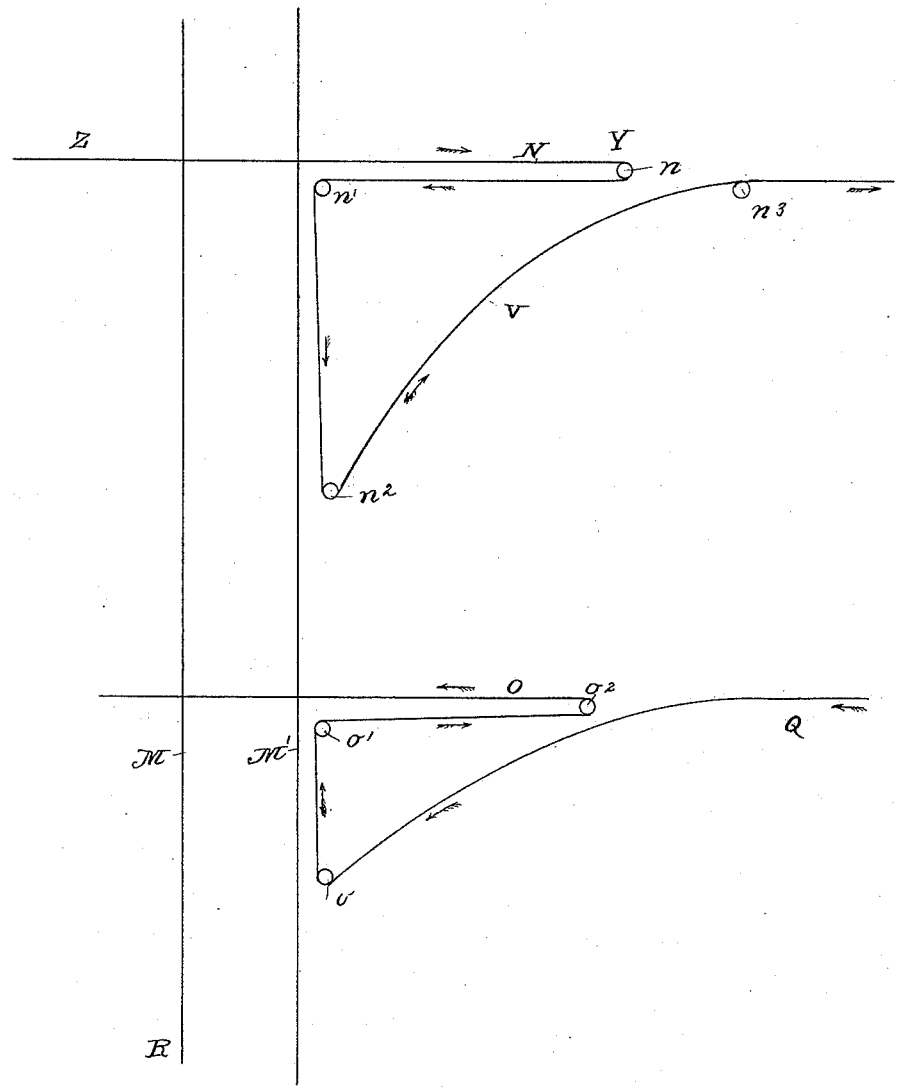
Witnesses
G. A. Tauberschmidt,
C. F. Beer.
Inventor
James E. Morris
By his Attorney
Edwin S. Clarkson

UNITED STATES PATENT OFFICE.

JAMES E. MORRIS, OF CHESTER, PENNSYLVANIA, ASSIGNOR OF ONE-HALF TO WILLIAM H. WILLIAMS, OF SAME PLACE.

TRANSFERRING CABLE CARS FROM ONE LINE TO A CROSSING LINE.

SPECIFICATION forming part of Letters Patent No. 467,457, dated January 19, 1892.

Application filed June 21, 1890. Serial No. 356,209. (No model.)

*To all whom it may concern:*

Be it known that I, JAMES E. MORRIS, a citizen of the United States, residing at Chester, in the county of Delaware and State of Pennsylvania, have invented certain new and useful Improvements in Means for Transferring Cable Cars from One Line to a Crossing Line; and I do hereby declare the following to be a full, clear, and exact description of the invention, such as will enable others skilled in the art to which it appertains to make and use the same.

My invention relates to a method of laying cables around curves of a railway-line; and it consists of a means for transferring cars from one line to a crossing line, which consists in a loop of one of the main cables formed by deflecting said cable from its direct course and carrying it around sheaves in such manner as to traverse a curve or approximate curve around the angle of two lines.

The figure illustrating my invention is a plan view of the cables laid by my method.

In the figure I have shown a method of laying cables around curves in an economical and practical manner, in which—

M M' are cables running east and west, and N and O are cables running north and south on different streets, one cable only being shown on each of the north and south streets; but it will be understood that I can use two cables on each of the streets, respectively, with equal facility.

The cable N is bent around sheave $n$, and is then drawn back through the same conduit and passed around sheave $n'$, which is secured at the corner of the east and west and north and south conduits. The cable is then drawn through the east and west conduit and passed around sheave $n^2$. It is then drawn through the curve conduit to the same conduit from which it was deflected, this arrangement serving to switch the east and west line of cars to the north and south line. In the lower part of the figure I have shown a similar arrangement of the cable, the only difference being in laying the cable in such a manner as to switch the north and south cars to the east and west line. In this instance the north and south cable is first drawn around the curve, then around sheave $o$, through the east and west conduit to sheave $o'$, thence through the north and south conduit to sheave $o^2$, thence around said sheave, and resuming its regular course, as indicated by the arrow.

In the view illustrating my invention a car at Z is running on cable N (see upper portion of figure) and approaching the crossing cables. The grip is now released from the cable and carried over the crossing cables by a suitable means and drops into position. After crossing the cross-cables the cable is again taken up. The grip is now approaching the sheave $n$, and to prevent it from being caught in the sheave the grip is released and carried over the sheave by a suitable means. The cable is again taken up at $n^3$. It is obvious that the momentum of the car will carry it over the intervening spaces, where the grip is released. It is now desired to switch a car from the east and west line to the north and south line. The gripman opens the grip before the car reaches the curve V, and the momentum of the car carries it past sheave $n^2$. The grip is then closed and the cable taken up and the car continues around the curve to the north and south line without further interruption. It is now desired to switch a car from the north and south line to the east and west line, reference being had to the lower portion of the figure. The car Q passes from the north and south line around the curve, the grip still holding the cable. As the grip approaches the sheave $o$ it is released to prevent it from striking the said sheave, and is carried across the crossing cables by a suitable means until it reaches a point indicated by the letter R, where the grip is dropped and takes up the east and west cable.

This method of laying cables around curves obviates the necessity of having a number of horses stationed at each curve to pull the cars around corners or in scutching from one line to a crossing line, and dispenses with the supplemental cable now employed upon curves.

In the drawing I have simply shown the cables for sake of clearness.

The subject-matter of this application originally formed a part of an application filed by me April 18, 1890, and given Serial No. 348,507.

Having thus fully described my invention, what I claim, and desire to secure by Letters Patent, is—

1. In a cable railway, the means for transferring cars from one line to a crossing line, which consists in a loop of one of the main cables formed by deflecting said cable from its direct course and carrying it around sheaves in such a manner as to traverse a curve or approximate curve around the angle of the two lines, as set forth.

2. In a cable railway, the means for transferring cars from one line to a crossing line, which consists of a main cable deflected from its direct course at $n$ to a point on the intersecting line below its direct course, and thence around a curve back to its direct course.

3. In a cable railway, the means for transferring cars from one line to a crossing line, which consists of a main cable deflected at $n$ and carried back in the same conduit around the angle of the two lines, along the crossing conduit, around the sheave $n^2$, and through the curved conduit to its original course.

In testimony whereof I affix my signature in presence of two witnesses.

JAMES E. MORRIS.

Witnesses:
CHARLES PALMER,
JOS. H. HINKSON.